Sept. 8, 1942.                     W. R. FREEMAN                    2,294,974
                     COMBINED FLUID MOTOR AND SLACK ADJUSTER
                              Filed March 1, 1941
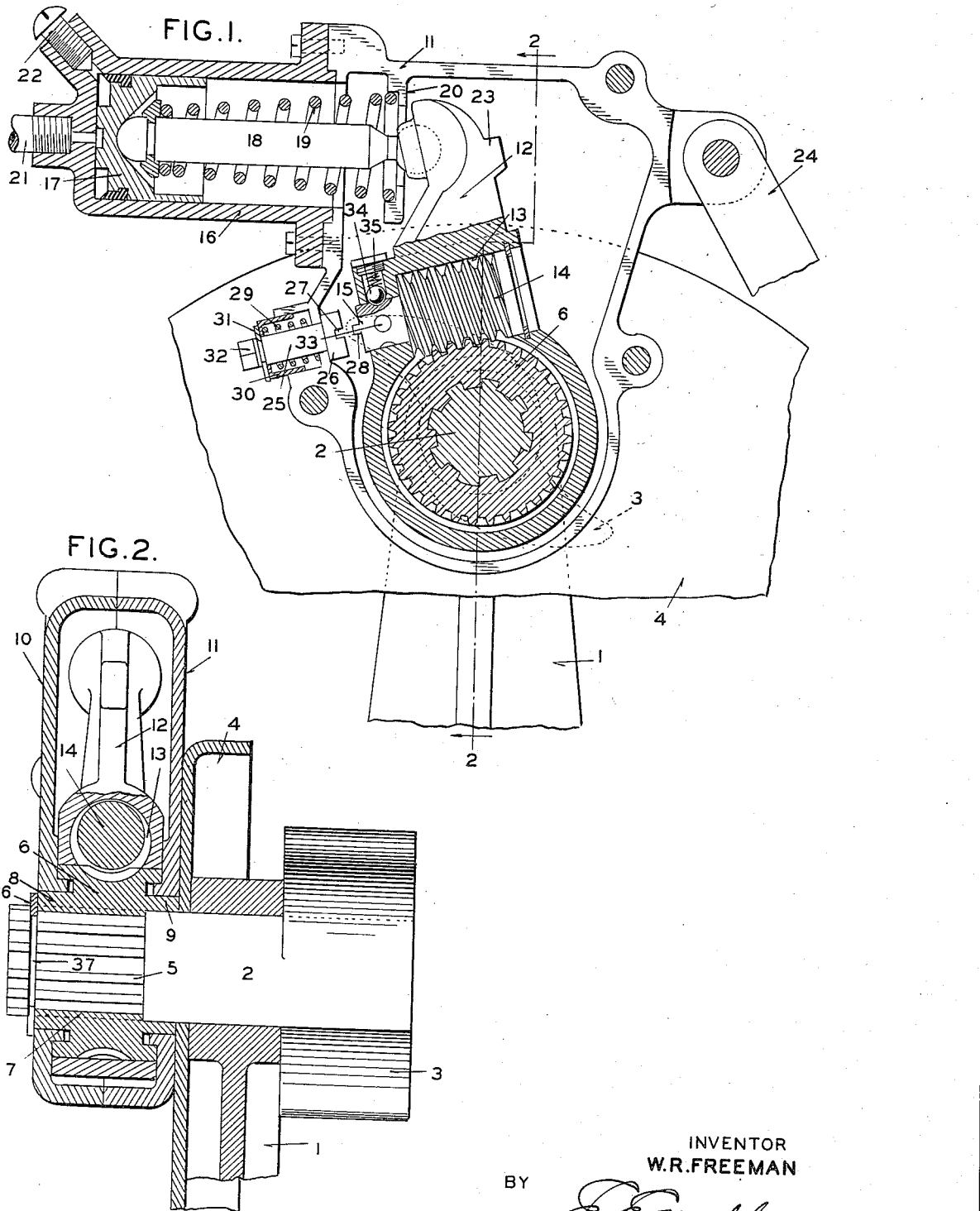
INVENTOR
W.R. FREEMAN
BY
ATTORNEY Patented Sept. 8, 1942

2,294,974

UNITED STATES PATENT OFFICE 2,294,974

COMBINED FLUID MOTOR AND SLACK ADJUSTER

Walter R. Freeman, Clayton, Mo., assignor to Wagner Electric Corporation, St. Louis, Mo., a corporation of Delaware Application March 1, 1941, Serial No. 381,319

9 Claims. (Cl. 188—79.5)

My invention relates to slack adjusters and more particularly to slack adjusters for cam-actuated brakes.

One of the objects of my invention is to provide an improved slack adjuster mechanism for association with a fluid pressure actuating means for a shaft.

Another object of my invention is to provide a unitary structure comprising a fluid actuating motor, an actuating arm, and slack adjusting means which can be readily connected with and supported on a shaft employed in actuating a brake assembly.

Still another object of my invention is to provide a combined fluid motor and slack adjuster of the kind referred to which is enclosed against dust and dirt yet can be easily adjusted from the exterior to take up slack in the brake actuating means due to lining wear.

Other objects of my invention will become apparent from the following description taken in connection with the accompanying drawing in which Figure 1 is a view of a portion of a brake having associated therewith a combined fluid actuating motor, an actuating arm, and slack adjusting means embodying my invention, parts being shown in section; and Figure 2 is a sectional view taken on the line 2—2 of Figure 1.

Although I have chosen to show my invention embodied in structure for actuating the cam shaft of a brake, it is to be understood that the combined fluid actuating motor, actuating arm, and slack adjusting means may be used wherever it is desired to rotate a shaft by an arm and provide means for adjusting the arm with respect to the shaft.

Referring to the drawing in detail, numeral 1 indicates a portion of the supporting spider for a brake in which is journaled a cam shaft 2 provided with an "S" type cam 3 on its inner end for actuating the ends of a brake friction device (shoes) in a well-known manner. The outer end of the cam shaft projects beyond the closure or dust plate 4 of the brake which encloses the drum and said outer end is provided with splines 5. A worm gear 6 having internal teeth 7 cooperating with the splines is mounted on this outer end of the shaft. The worm gear has integral annular flanges 8 and 9 on opposite sides thereof for supporting companion casing parts 10 and 11 which are bolted together to form a closure from which dust and dirt is excluded.

Within the casing is an actuating arm 12 having an opening in one end permitting it to be mounted on the worm gear 6 and held thereon by the parts 10 and 11 of said casing. In a bore 13 of the arm there is journaled a worm 14 having a short extension 15 extending to the exterior of the arm. The teeth of the worm are in constant mesh with the teeth of the worm gear and thereby provide a connection between arm 12 and the cam shaft. If the worm is rotated, the arm will be moved relatively to the shaft, thus providing adjustment.

On the casing parts adjacent the end of arm 12 there is secured a cylinder 16 in which is mounted a piston 17 connected to the arm by means of a rod 18. A spring 19 surrounds the rod and has one end abutting the piston and the other end abutting projections 20 on the casing parts. The rod 18 is connected to the piston and arm by ball and socket joints and, therefore, the spring 19 will normally bias the piston against the end of the cylinder and hold the arm in an inoperative position at one side of the casing closure, as shown in Figure 1. Fluid under pressure from a suitable source (not shown) is transmitted to the cylinder ahead of the piston through a conduit 21. Since the fluid employed in this particular instance is a liquid, there is also provided a bleed valve 22 for permitting air to be removed as is usual practice. The arm 12 has a projection 23 which is engageable with the casing to limit the movement of the arm by the piston. The casing and the cylinder are held against movement by a link 24 which has one end attached to the casing and the other end to a convenient fixed member.

Since it is intended that the arm, worm and worm gear all be enclosed by the casing, means is provided for permitting the worm to be rotated from the exterior of the casing. The structure I employ for this operation comprises a short shaft 25 journaled in the casing at the juncture of the casing parts 10 and 11 and at a point where it will be in axial alignment with the axis of the worm when the arm is inoperative. The inner end of this shaft has a head 26 provided with a slot 27 which is adapted to receive a projection 28 carried on the end of extension 15 of the worm to thus provide a disengageable clutch means for connecting the shaft 25 to the worm. A spring 29 biases the shaft to a position where the head engages the casing and the clutch parts are disengaged. This spring 29 is interposed between the casing parts and a cup-shaped member 30 telescopically received in a bore and held on shaft 25 by a C washer 31. The outer end of the shaft is provided with flats 32 for receiving a suitable tool. In order that the worm may be held in its adjusted position, the extension 15 has circumferentially spaced depressions 33 for cooperation wtih a ball 34 backed by a spring 35 carried by arm 12.

Referring to the operation, the parts assume the positions shown in Figure 1 when the brake is inoperative. The spring 19 biases the piston against the end of the cylinder and the arm is carried with it by rod 19. The cam shaft and the cam are thus also biased to their inoperative positions. When it is desired to actuate the cam and cam shaft, fluid under pressure is transmitted to the cylinder ahead of the piston, thus causing it to move to the right and rotate the arm 12 and the cam shaft in a clockwise direction. When the brake is released by the release of the fluid pressure, the parts return to the positions shown in Figure 1.

If the lining of the brake friction element should become worn so that the cam cannot be rotated a sufficient extent by the piston to properly apply the brake, an adjustment can be readily made so that the cam can be rotated farther in a clockwise direction. The adjustment is accomplished when the parts are in the positions shown in Figure 1. First the short shaft 25 is pressed inwardly so that the slot 27 receives the projection 28 to connect the shaft to the worm. If the shaft 25 is now rotated by employing a tool in cooperation with the flats 32, the cam shaft 2 can be rotated relatively to arm 12 by the worm and worm gear. This causes the inoperative position of the brake friction element (shoes) to be moved closer to the brake drum. Thus when the cam is again rotated by the piston, the friction element can be again properly applied to the drum.

In connection with my invention it is to be noted that the worm, the worm gear, the arm, the casing, and the piston and cylinder are all a unitary structure which is hung or supported on the end of the cam shaft journaled solely in the spider or support 1 of the brake. No special support is needed for the structure. The casing supports the piston and cylinder and also insures that the worm and worm wheel will be totally enclosed. Adjustment between the arm and cam shaft can be easily accomplished from the exterior of the casing by merely pressing inwardly on the shaft 25 and then rotating it. Since there is provided a unitary structure, it may be easily mounted on the shaft by merely slipping it over the end of the cam shaft so that the splines 5 cooperate with the internal teeth of the worm gear. The link 24 for holding the casing from movement may be readily connected and disconnected. In order that the casing and other parts of the unitary structure may be held on the outer end of the cam shaft, a C washer 36 may be employed, said washer cooperating with a groove 37 in the cam shaft.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In apparatus of the class described, a shaft, an actuating arm mounted on the shaft, adjusting means between the arm and the shaft, means for operating the arm, means for biasing the arm to an inoperative position, a fixed casing surrounding the arm and the portion of the shaft to which it is connected, and means for operating the adjusting means from the exterior of the casing, said last named means comprising a member carried only by the casing and having a portion extending to the exterior thereof, and means for connecting said member to the adjusting means only when the arm is in an inoperative position.

2. In apparatus of the class described, a shaft, an actuating arm mounted on the shaft, adjusting means between the arm and the shaft, means for operating the arm, means for biasing the arm to an inoperative position, a fixed casing surrounding the arm and the portion of the shaft to which it is connected, means for operating the adjusting means from the exterior of the casing, said last named means comprising a shaft mounted for rotation and for reciprocation in the casing wall, and means for operatively connecting said last named shaft to the adjusting means by an axial movement and only when the arm is in an inoperative position.

3. In apparatus of the class described, a rotatable actuating shaft, an arm mounted on said shaft, adjustable means connecting the arm to the shaft comprising a worm gear secured to the shaft and a cooperating worm carried by the arm, a casing enclosing said arm, worm gear and worm and supported on the shaft, a fluid motor mounted on the casing and having its movable element connected to the arm, means for holding the casing against movement, means for biasing the arm to an inoperative position, and means for rotating the worm from the exterior of the casing and comprising a shaft rotatably supported on the casing and adapted to be connected with the worm.

4. In apparatus of the class described, a rotatable actuating shaft, an arm mounted on said shaft, adjustable means connecting the arm to the shaft comprising a worm gear secured to the shaft and a cooperating worm carried by the arm, a casing enclosing said arm, worm gear and worm and supported on the shaft, a fluid motor mounted on the casing and having its movable element connected to the arm, means for holding the casing against movement, means for biasing the arm to an inoperative position, means for rotating the worm from the exterior of the casing, said last named means comprising a shaft mounted on the casing for rotation and for limited reciprocation and having a part extending to the exterior of the casing, said last named shaft being in alignment with the axis of the worm when the arm is in inoperative position, and cooperating means on the inner end of the shaft and on the worm for connecting the shaft to the worm when the shaft is moved axially inwardly.

5. In apparatus of the class described, a shaft, an actuating arm connected to rotate the shaft, means for adjusting the arm with respect to the shaft, a casing totally enclosing the arm and mounted on and supported solely by the shaft, means for operating the adjusting means from the exterior of the casing, a fluid motor secured to the casing and having a movable element, a rod connecting the movable element to the end of the arm, a spring surrounding the rod and having one end abutting a portion of the casing and its other end acting on the movable element of the motor to thereby bias said element and the arm to an inoperative position, and means for preventing the casing from rotating about the shaft axis.

6. Combined actuating and adjusting means for mounting as a unit on a shaft journaled in a support, said means comprising a member for non-rotatable attachment to the shaft, an arm mounted on the member and connected therewith for simultaneous movement, a second member mounted on said first member, means for preventing movement of the second member, means for adjusting the arm with respect to the first member and comprising a shaft journaled in the second member, and a fluid motor carried by the second member and connected to actuate the arm.

7. Combined actuating and adjusting means for mounting as a unit on a shaft journaled in a support, said means comprising a member for non-rotatable attachment to the shaft, an arm mounted on the member, adjustable means for connecting the arm to the member for simultaneous movement, a casing supported on said member and enclosing the arm, means for preventing movement of the casing, means for operating the adjustable means from the exterior of the casing and comprising a rotatable shaft journaled in the casing wall, and a fluid motor carried by the casing and connected to actuate the arm.

8. Combined actuating and adjusting means for mounting as a unit on a splined shaft journaled in a support, said means comprising a worm gear provided with internal splines, an actuating arm supported on the gear, a worm carried by the arm and cooperating with the worm gear, a casing supported solely on the worm gear and totally enclosing the arm and worm, a fluid motor attached to the casing and connected to the arm, means for rotating the worm from the exterior of the casing, and means on the casing for connecting it to a fixed member to prevent movement thereof around the axis of the shaft when the unitary means is mounted on the shaft by so positioning the worm gear thereon that the splines are in cooperative relationship.

9. Combined actuating and adjusting means for mounting as a unit on a splined shaft journaled in a support, said means comprising a worm gear provided with internal splines, an actuating arm supported on the gear, a worm carried by the arm and cooperating with the worm gear, a casing supported on the worm gear and enclosing the arm and worm, a fluid motor attached to the casing and connected to the arm, means for rotating the worm from the exterior of the casing, said last named means comprising a shaft journaled in a wall of the casing and means for connecting the shaft to the worm by an axial movement of the shaft when the arm is in an inoperative position, and means on the casing for connecting it to a fixed member to prevent movement thereof around the axis of the shaft when the unitary means is mounted on the shaft by so positioning the worm gear thereon that the splines are in cooperative relationship.

WALTER R. FREEMAN.